(12) United States Patent
Xing et al.

(10) Patent No.: US 10,303,004 B2
(45) Date of Patent: May 28, 2019

(54) METHOD FOR MANUFACTURING QUANTUM DOT DISPLAY DEVICE AND CORRESPONDING QUANTUM DOT DISPLAY DEVICE

(71) Applicants: BOE TECHNOLOGY GROUP CO., LTD., Beijing (CN); CHENGDU BOE OPTOELECTRONICS TECHNOLOGY CO., LTD., Chengdu, Sichuan Province (CN)

(72) Inventors: Weiqiang Xing, Beijing (CN); Yongmao Wang, Beijing (CN); Jinyang Deng, Beijing (CN); Zhenhua Mao, Beijing (CN); Hongchao You, Beijing (CN); Ming Luo, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 0 days.

(21) Appl. No.: 15/569,082

(22) PCT Filed: Apr. 24, 2017

(86) PCT No.: PCT/CN2017/081561
§ 371 (c)(1),
(2) Date: Oct. 24, 2017

(87) PCT Pub. No.: WO2018/068495
PCT Pub. Date: Apr. 19, 2018

(65) Prior Publication Data
US 2018/0292715 A1 Oct. 11, 2018

(30) Foreign Application Priority Data
Oct. 11, 2016 (CN) .......................... 2016 1 0886181

(51) Int. Cl.
*B41F 3/28* (2006.01)
*G02F 1/1333* (2006.01)
(Continued)

(52) U.S. Cl.
CPC .......... *G02F 1/133723* (2013.01); *B41F 3/28* (2013.01); *G02F 1/1333* (2013.01);
(Continued)

(58) Field of Classification Search
CPC combination set(s) only.
See application file for complete search history.

(56) References Cited

U.S. PATENT DOCUMENTS

2008/0079880 A1    4/2008   Mochizuki et al.
2013/0146903 A1    6/2013   Ichikawa et al.
(Continued)

FOREIGN PATENT DOCUMENTS

CN    102916097 A    2/2013
CN    103165645 A    6/2013
(Continued)

OTHER PUBLICATIONS

International Search Report and Written Opinion in PCT/CN2017/081561 dated Jul. 19, 2017, with English translation.
(Continued)

*Primary Examiner* — Lauren Nguyen
(74) *Attorney, Agent, or Firm* — Womble Bond Dickinson (US) LLP

(57) ABSTRACT

The present disclosure relates to the field of quantum dot display technology and discloses a method for manufacturing a quantum dot display device. The method comprises: providing an array substrate and a counter substrate opposite to each other; printing an alignment solution containing a quantum dot material onto a side of the array substrate facing the counter substrate; removing a solvent in the
(Continued)

alignment solution printed onto the side of the array substrate facing the counter substrate; heating the array substrate after removal of the solvent; and providing a backlight source at a side of the array substrate facing away from the counter substrate. The present disclosure further relates to a corresponding quantum dot display device. With such a manufacturing method, the display quality of the resulting quantum dot display device is greatly improved, and the associated manufacturing cost and process difficulty are reduced.

13 Claims, 2 Drawing Sheets

(51) Int. Cl.
  *G02F 1/1335* (2006.01)
  *G02F 1/1337* (2006.01)
  *G02F 1/13357* (2006.01)

(52) U.S. Cl.
  CPC ...... *G02F 1/1336* (2013.01); *G02F 1/133382* (2013.01); *G02F 1/133617* (2013.01); *G02F 2001/133614* (2013.01); *G02F 2202/36* (2013.01)

(56) References Cited

U.S. PATENT DOCUMENTS

| | | | |
|---|---|---|---|
| 2014/0175707 | A1 | 6/2014 | Wolk et al. |
| 2016/0223869 | A1 | 8/2016 | Sim et al. |
| 2017/0255056 | A1 | 9/2017 | Liu |
| 2017/0261779 | A1 | 9/2017 | Ma et al. |
| 2017/0285822 | A1 | 10/2017 | Yan |
| 2017/0306235 | A1* | 10/2017 | Jeon ........................ C09K 19/56 |

FOREIGN PATENT DOCUMENTS

| | | |
|---|---|---|
| CN | 204389849 U | 6/2015 |
| CN | 104937695 A | 9/2015 |
| CN | 104978096 A | 10/2015 |
| CN | 105116604 A | 12/2015 |
| CN | 105242441 A | 1/2016 |
| CN | 105467682 A | 4/2016 |
| CN | 105527758 A | 4/2016 |
| CN | 105733557 A | 7/2016 |
| CN | 105759491 A | 7/2016 |
| CN | 106226943 A | 12/2016 |

OTHER PUBLICATIONS

Office Action received for Chinese Patent Application No. 201610886181.1, dated Nov. 5, 2018, 17 pages (9 pages of English Translation and 8 pages of Office Action).

* cited by examiner

METHOD FOR MANUFACTURING QUANTUM DOT DISPLAY DEVICE AND CORRESPONDING QUANTUM DOT DISPLAY DEVICE

RELATED APPLICATION

The present application is the U.S. National Phase Entry of PCT/CN2017/081561, with an international filing date of Apr. 24, 2017, which claims the priority benefit of Chinese Patent Application No. 201610886181.1, filed on Oct. 11, 2016, the entire disclosure of which is incorporated herein by reference.

TECHNICAL FIELD

The present disclosure relates to the field of quantum dot display technology, and specifically to a method for manufacturing a quantum dot display device and a corresponding quantum dot display device.

BACKGROUND

With the rapid development in the display field, the quantum dot display technology attracts more and more attention by virtue of its advantages such as unique luminescent property, excellent stability, wider color gamut coverage, relatively low cost and the like. At present, in a display device that utilizes the quantum dot display technology, the quantum dot material is usually excited by blue light emitted by a backlight source to emit red light and green light, thus providing color display. In essence, a quantum dot display device is a device that achieves color display by means of the photoluminescence effect of the backlight source and the quantum dot material.

For the existing quantum dot display device, the quantum dot material is usually made into a quantum dot thin film mainly by a lithography technique, an epitaxial growth technique, and the like. Thereafter, such a quantum dot thin film is implanted between the backlight source and the display panel (specifically, the array substrate), thereby obtaining a quantum dot display device. However, since the quantum dot material has a large specific surface area and a high surface energy, the above conventional methods generally fail to avoid the deterioration phenomena such as agglomeration of the quantum dot material occurring during the process. In addition, no matter which technique is used, it is necessary to first produce a quantum dot thin film, and then implant it between the backlight source and the array substrate. It is thus clear that this will inevitably lead to potential contact of the quantum dot material with air. In this regard, in the prior art, it is generally desirable to specifically package the quantum dot film to prevent direct contact between air and the quantum dot material, thereby ensuring that the quantum dot material will not degrade. However, such special packaging will necessarily increase the production cost of the quantum dot thin film and the corresponding process difficulty. In addition, the epitaxial technique generally further requires more expensive equipment, and also involves a relatively complex process, so it is not suitable for large-scale industrial production. In summary, the processing methods for the quantum dot material in the prior art, on the one hand, easily causes the deterioration phenomena such as agglomeration of the quantum dot material, and on the other hand, is further accompanied with a special packaging process, both of which not only go against improvement of the display quality of the quantum dot display device, but also further increase the associated manufacturing cost and process difficulty.

SUMMARY

In view of the above, embodiments of the present disclosure provide a method for manufacturing a quantum dot display device and a corresponding quantum dot display device in order to alleviate or eliminate one or more of the disadvantages or deficiencies indicated above.

According to an aspect, an embodiment of the present disclosure provide a method for manufacturing a quantum dot display device. The method comprises: providing an array substrate and a counter substrate opposite to each other; printing an alignment solution containing a quantum dot material onto a side of the array substrate facing the counter substrate; removing a solvent in the alignment solution printed onto the side of the array substrate facing the counter substrate; heating the array substrate after removal of the solvent; and providing a backlight source at a side of the array substrate facing away from the counter substrate. For the manufacturing method according to the embodiment of the present disclosure, the quantum dot material is directly embedded in the alignment film, while the alignment film is directly formed on the surface of the array substrate. In this way, direct contact of the quantum dot material with air and possible liquid crystal materials is effectively prevented, thereby avoiding possible contamination of the quantum dot material and ensuring its effectiveness. In addition, the alignment film containing the quantum dot material is directly formed on the surface of the array substrate. In this case, the quantum dot material is in fact inside the display panel, thus avoiding the special packaging requirement for the quantum dot material and ensuring its relative independence.

According to a specific embodiment, printing of the alignment solution is accomplished by a relief printing process. Further, such a relief printing process comprises dropping the alignment solution onto an anilox roller by a dispenser; by means of rotation of the anilox roller and a printing roller on which a relief printing plate is mounted, transferring the alignment solution dropped onto the anilox roller to the relief printing plate, with a rotation direction of the printing roller being opposite to that of the anilox roller and a ratio of linear velocities thereof being within a certain range, and with the relief printing plate being at least partially in contact with and pressed against the anilox roller during rotation with the printing roller; and by means of rotation of the relief printing plate and translation of the array substrate, transferring the alignment solution transferred to the relief printing plate onto the array substrate. During the transferring process, the relief printing plate is externally tangent to the array substrate, and they have equal linear velocities. Further, a ratio of rotational linear velocities of the printing roller and the anilox roller may be 1.05 to 0.09.

Compared to the conventional lithographic technique, the relief printing process provided by the embodiment of the present disclosure enables the alignment solution containing the quantum dot material to be transferred onto the array substrate more uniformly. Moreover, such a relief printing process also helps to prevent the deterioration phenomena such as agglomeration of the quantum dot material, thereby enhancing the effectiveness of the quantum dot material, and guaranteeing the display quality of the quantum dot display device.

According to a further embodiment, the method for manufacturing a quantum dot display device provided by this aspect of the present disclosure further comprises: providing a liquid crystal cell between the array substrate and the counter substrate, with printed patterns of the relief printing plate being corresponding to patterns of the liquid crystal cell. Further, there may further exist a gap region between printed patterns of the relief printing plate. Since the printing patterns of the relief printing plate directly determines the pattern distribution of the alignment film (containing the quantum dot material) finally printed onto the array substrate, by making the printed patterns of the relief printing plate corresponding to the patterns of the liquid crystal cell, it is ensured that there is a corresponding quantum dot material portion for each liquid crystal cell. In addition, the gap region between the printed patterns of the relief printing plate also allows relative independence between the respective liquid crystal cells, thereby preventing adverse effects such as crosstalk in display.

According to a further specific embodiment, the relief printing of the alignment solution further comprises: prior to transferring the alignment solution dropped onto the anilox roller to the relief printing plate, planarizing the alignment solution dropped onto the anilox roller using a scraper. With such a scraper, the alignment solution dropped onto the anilox roller can be distributed more evenly, thereby facilitating further uniform transferring onto the relief printing plate and improvement of the display effect of the quantum dot display device.

According to a specific embodiment, removing the solvent in the alignment solution used by the above manufacturing method comprises removal by freeze-drying treatment. Further, such a freeze-drying treatment comprises: placing the array substrate onto which the alignment solution is printed in a freeze-drying apparatus; freezing the array substrate in the freeze-drying apparatus; vacuumizing the freeze-drying apparatus after freezing; and heating the array substrate in the vacuumized freeze-drying apparatus. During such a freeze-drying process, the solvent is removed by sublimation under high vacuum. Compared to the conventional solvent volatilization technique, the freeze-drying treatment according to this specific embodiment can decrease the surface energy of the quantum dot material so as to avoid as much as possible the deterioration phenomena such as agglomeration of the quantum dot material occurring during the process treatment.

According to a specific embodiment, heating the array substrate after removal of the solvent comprises microwave heating. Further, such microwave heating comprises: placing the array substrate from which the solvent is removed in a microwave heating apparatus; and heating the array substrate by a microwave process. Further, the microwave heating further comprises maintaining the array substrate at a constant temperature after heating the array substrate by a microwave process. It is generally required to subject the alignment material to heating processing considering the alignment function thereof. However, in addition to the alignment material, the alignment film at that time also contains the quantum dot material which has relatively high surface activity, so the conventional heating methods will inevitably lead to the deterioration phenomena such as agglomeration of the quantum dot material. The microwave heating technique according to the embodiment of the present disclosure has the advantages including fast rise in temperature, relatively short heating and heat preservation time, uniform heating, etc. as compared to the conventional resistive heating method.

According to a specific embodiment, the alignment material in the alignment solution includes a polyimide (PI) material. Of course, other equivalent alignment materials can be readily obtained by those skilled in the art in view of the teachings of the present disclosure, and the present invention is not limited to the polyimide material listed as an example.

According to a specific embodiment, the solvent used in the alignment solution includes an organic solvent. Specifically, such an organic solvent may include an aromatic solvent such as benzene. Likewise, according to the teachings of the present disclosure, those skilled in the art will readily appreciate other alternative organic solvents. By way of example, those skilled in the art will be able to select suitable organic solvents depending on the specific practical needs and corresponding alignment materials, which will not be limited in the present disclosure.

According to another aspect, an embodiment of the present disclosure further provides a quantum dot display device. Such a quantum dot display device is manufactured by means of the method for manufacturing a quantum dot display device as described in any one of the above embodiments.

Embodiments of the present disclosure disclose a method for manufacturing a quantum dot display device and a corresponding quantum dot display device. Specifically, for the method for a quantum dot display device, the quantum dot material is first dissolved in the alignment solution. In this way, after the alignment film is formed by means of the printing process of the alignment solution, the quantum dot material can be directly contained in the alignment film. In this case, direct contact of the quantum dot material with air and possible liquid crystal materials is effectively prevented, thereby protecting it from contamination and ensuring its effectiveness. In addition, since the alignment film containing the quantum dot material is directly formed on the surface of the array substrate, accordingly, the quantum dot material is completely inside the display panel. As a result, the special packaging requirement for the quantum dot material is avoided, and the relative independence of the quantum dot material and the luminescence effect are ensured. Therefore, with the above manufacturing process, the display effect of the resulting quantum dot display device is greatly improved, the associated manufacturing cost is reduced, and the manufacturing process and the packaging process are simplified.

DETAILED DESCRIPTION OF EMBODIMENTS

Figure 1:
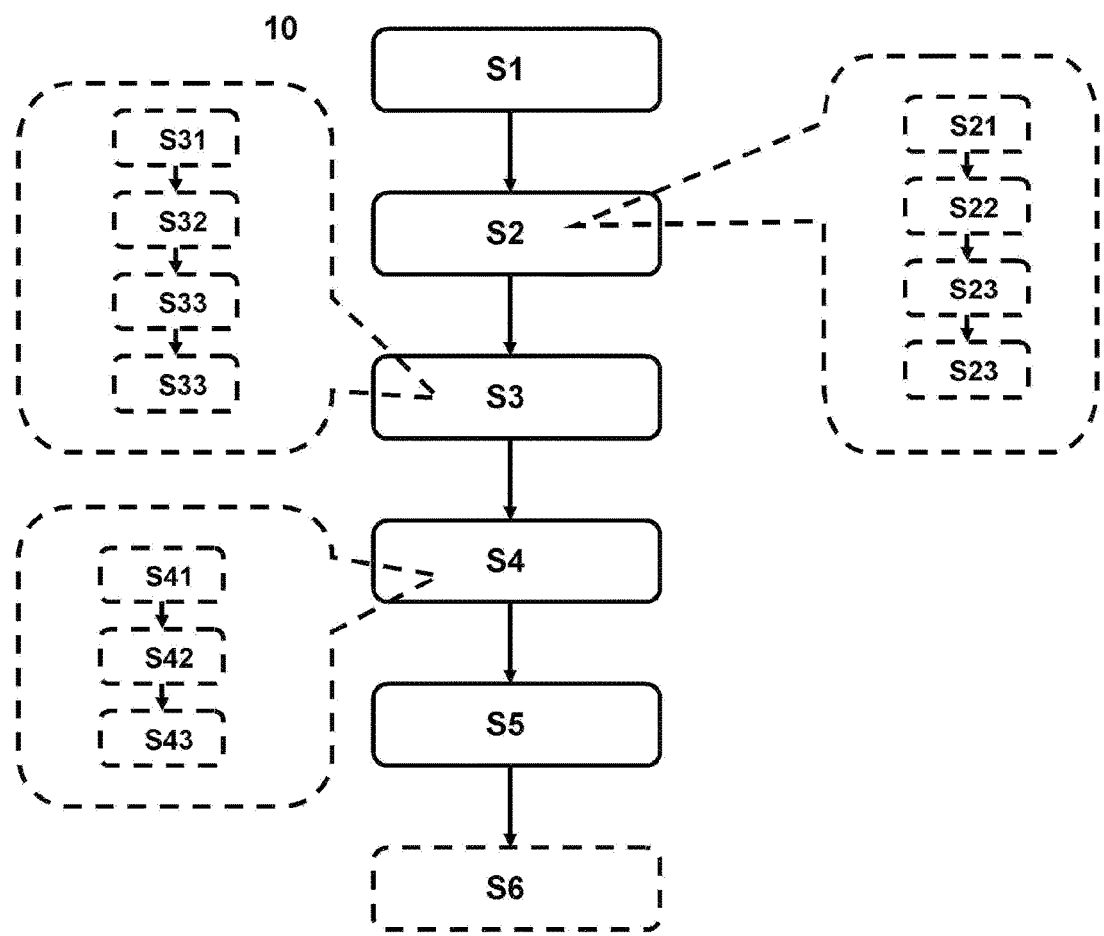
FIG. 1 is a schematic flow chart illustrating a method for manufacturing a quantum dot display device according to an embodiment of the present disclosure.

The quantum dot display device and the method for manufacturing the same as provided by embodiments of the present disclosure will be described below in detail with reference to the accompanying drawings. It is to be noted that the drawings are not necessarily plotted to scale, but generally focus on illustrating the principles of the present disclosure. Accordingly, the dimensions, positions, etc. of the elements, film layers, etc. shown in the drawings are not representative of the true dimensions, positions, etc., and are only for the purpose of facilitating the understanding to the embodiments and principles of the present disclosure.

Figure 2:
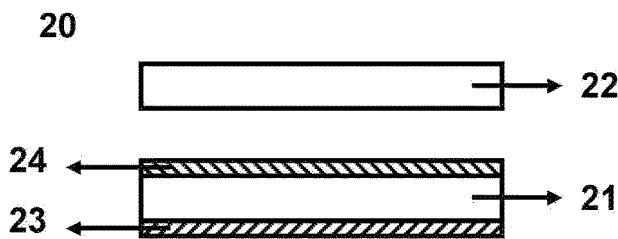
FIG. 2 is a schematic sectional view of a quantum dot display device according to an embodiment of the present disclosure.

According to an aspect, embodiments of the present disclosure provide a method for manufacturing a quantum dot display device. Specifically, referring to FIGS. 1 and 2, FIG. 1 is a schematic flow chart illustrating such a manufacturing method, and FIG. 2 is a schematic sectional view showing a quantum dot display device manufactured by means of such a manufacturing method. A method 100 may comprise: providing S1 an array substrate 21 and a counter substrate 22 opposite to each other; and printing S2 an alignment solution containing a quantum dot material onto a side (the upper surface schematically shown in FIG. 2) of the array substrate 21 facing the counter substrate 22. As well known to those skilled in the art, the alignment solution preferably needs to be used as soon as possible to avoid the phenomenon of precipitation in the alignment solution resulting from agglomeration of the quantum dot material due to a long standing time. Thus, it can be seen that the alignment solution printed onto the upper side of the array substrate 21 can form an alignment film 24 as shown in FIG. 2. Of course, the alignment film 24 at that time may only exhibit an almost liquid form like a water film. Thereafter, the method 100 for manufacturing a quantum dot display device 20 may further comprise: removing S3 a solvent in the alignment solution (i.e. alignment film 24) printed onto the side (the upper side schematically shown in FIG. 2) of the array substrate 21 facing the counter substrate 22; and after removing the solvent, heating S4 the array substrate 21. As described above, the alignment solution containing quantum dots is formed on the array substrate 21 as a water film after printing, which of course is problematic in practice. In view of this, the manufacturing method 100 according to the embodiments of the present disclosure further comprises a heating process for the array substrate 21. Such a heating S4 process functions in two aspects: on the one hand, the alignment solution printed onto the array substrate 21 is cured by heating to form an alignment film 24 having a fixed shape factor; on the other hand, heating enables imidization of the alignment material (which is for example polyimide) in the alignment film, thereby achieving the alignment function. Further, the manufacturing method 100 according to an embodiment of the present disclosure may further comprise: providing S5 a backlight source 23 at a side (the lower side schematically shown in FIG. 2) of the array substrate 21 facing away from the counter substrate 22. As will be readily understood by those skilled in the art, the luminescence of the quantum dot material needs to be achieved by means of excitation by other light sources. Therefore, according to the embodiment of the present disclosure, the method 100 for manufacturing the quantum dot display device 20 further comprises the step of providing the backlight source 23 as described above.

With the above-described manufacturing method according to embodiments of the present disclosure, the quantum dot material is embedded in the alignment film while the alignment film is directly formed on the surface of the array substrate. In this way, direct contact of the quantum dot material with air and possible liquid crystal materials is effectively prevented, thereby avoiding possible contamination of the quantum dot material and ensuring its effectiveness. In this case, the alignment film containing the quantum dot material will be inside the display panel, i.e. on a side of the array substrate facing the counter substrate, thereby avoiding the special packaging requirement for the quantum dot material and ensuring the relative independence of the quantum dot material.

Figure 3:
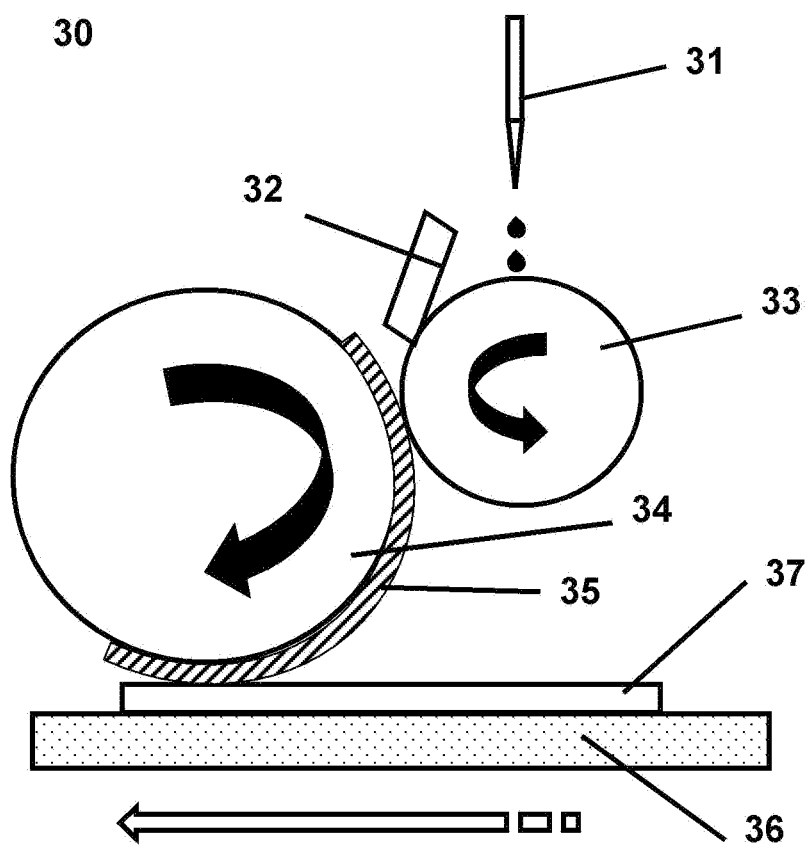
FIG. 3 is a schematic view showing the structure of a relief printing apparatus used during the relief printing process according to an embodiment of the present disclosure.

According to an embodiment, the printing S2 of the alignment solution can be carried out by relief printing. A specific example of such a relief printing process will be described below in detail with reference to FIGS. 1 and 3. FIG. 3 is a schematic view showing the structure of a relief printing apparatus 30 used in the relief printing process according to an embodiment of the present disclosure. Specifically, referring to FIG. 3, such a relief printing process may comprise the following steps: firstly, dropping S21 the alignment solution onto an anilox roller 33 by a dispenser 31; and then, by means of rotation of the anilox roller 33 and a printing roller 34 on which a relief printing plate 35 is mounted, transferring the alignment solution dropped onto the anilox roller 33 to the relief printing plate 35. During the above process, the rotation direction of the printing roller 34 is opposite to that of the anilox roller 33 (see the clockwise and counterclockwise rotation directions as shown in FIG. 3). In addition, the relief printing plate 35 is at least partially in contact with and pressed against the anilox roller 33 during rotation with the printing roller 34 so that the alignment solution can be transferred to the relief printing plate 35. Moreover, as well known to those skilled in the art, the ratio of the linear velocity of the anilox roller 33 to that of the printing roller 34 is generally controlled in a certain range. By way of example, the ratio of linear velocities may be kept in the range of 1.05 to 0.95. As will be readily appreciated by those skilled in the art, the alignment solution is transferred by means of the relative rotation of the above two rollers (anilox roller 33 and printing roller 34). Further, the relief printing process may further comprise: by means of rotation of the relief printing plate 35 (e.g., clockwise rotation schematically shown in FIG. 3) and translation of an array substrate 37 (e.g., leftward translation schematically shown in FIG. 3), transferring S24 the alignment solution transferred to the relief printing plate 35 onto the array substrate 37. During such a transferring S24 process, the relief printing plate 35 is always externally tangent to the array substrate 37. Furthermore, as well known to those skilled in the art, the linear velocity of translation of the array substrate 37 generally needs to be the same as the linear velocity of rotation of the printing roller 34 during the transferring process. Of course, as a specific example, the array substrate 37 may first be placed on a printing table 36 prior to the transferring S24 process described above, and then both of them 36, 37 are translated leftwards together. In this way, the transferring S24 of the alignment solution is completed by combination with the corresponding rotation (e.g., clockwise rotation schematically shown in FIG. 3) of the printing roller 34 (and the relief printing plate 35 thereon).

The alignment solution containing the quantum dot material can be more uniformly transferred onto the array substrate by the relief printing process provided by embodiments of the present disclosure as compared to the conventional lithographic technique. Moreover, such relief printing process also helps to prevent the deterioration phenomena such as agglomeration of the quantum dot material, thereby enhancing the effectiveness of the quantum dot material, and guaranteeing the display quality of the quantum dot display device.

Figure 4:
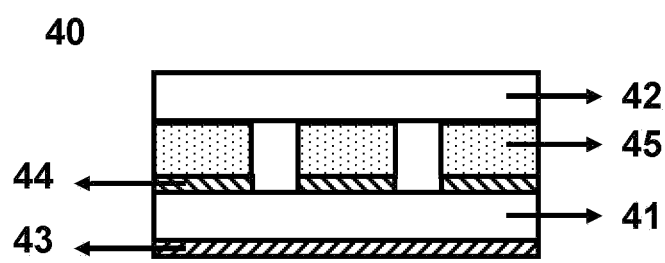
FIG. 4 is a schematic sectional view of quantum dot display device according to another embodiment of the present disclosure.

According to a further embodiment, the method for manufacturing a quantum dot display device provided by an embodiment of the present disclosure may further comprise a process of providing a liquid crystal cell. Specifically, referring to FIG. 4, it shows a schematic sectional view of another quantum dot display device according to an embodiment of the present disclosure. A quantum dot display device 40 shown in FIG. 4 is substantially the same as the quantum dot display device 20 shown in FIG. 2, i.e. comprising an array substrate 41, a counter substrate 42 and a backlight source 43. However, in the case shown in FIG. 4, there further exists a liquid crystal cell 45 between the array substrate 41 and the counter substrate 42, and such a liquid crystal cell 45 and an alignment film 44 have corresponding pattern distributions. In addition, there is a corresponding gap region between adjacent patterns of the liquid crystal cell 45 and between adjacent patterns of the alignment film 44. The quantum dot display device 40 can be obtained by enabling the printed patterns of the relief printing plate 35 to be corresponding to the patterns of the liquid crystal cell 45, and providing a gap region between the printed patterns of the relief printing plate 35. By way of example, further referring to FIG. 3, when the relief printing plate 35 on the printing roller 34 and the array substrate 37 are in contact with each other, under a pressure with an indentation depth of 0.1 mm±0.05 mm (e.g., the nip of the roller is maintained at 10±2 mm while the nip of the plate is maintained at 15±2 mm), the alignment solution is transferred onto the array substrate 37 by the printing patterns of the relief printing plate 35 to have a corresponding pattern distribution.

Specifically, it can be seen from the specific printing processes S21, S23 and S24 described above that, the pattern distribution of the alignment film finally printed onto the array substrate is depended on the printed patterns of the relief printing plate. That is, the pattern distribution of the alignment film as shown in FIG. 4 directly reflects the printed pattern distribution of the relief printing plate. Thus, by making the printed patterns of the relief printing plate corresponding to the patterns of the liquid crystal cell, it is ensured that there is a corresponding alignment film portion for each liquid crystal cell, that is, a corresponding quantum dot material portion. In addition, the gap region between the printed patterns of the relief printing plate also allows relative independence between the liquid crystal cells, thereby preventing adverse effects such as crosstalk in display.

According to a further embodiment, the relief printing process of the alignment solution may further comprise: prior to transferring the alignment solution dropped onto the anilox roller 33 to the relief printing plate 35, planarizing the alignment solution dropped onto the anilox roller 33 using a scraper 32. With such a scraper 32, the alignment solution dropped onto the anilox roller 33 can be distributed more uniformly, thereby facilitating further uniform transferring onto the relief printing plate 35 and improvement of the display effect of the quantum dot display device.

According to a specific embodiment, removing S3 the solvent in the alignment solution may comprise removal by freeze-drying treatment. Freeze-drying can also be called sublimation drying, which refers to a drying method in which the aqueous material is frozen to a temperature below the freezing point so that water is converted to ice, and then the ice is converted to vapor under high vacuum. Specifically, the water vapor generated by sublimation can be removed by a condenser. The implementation of such freeze-drying treatment will be described in further detail with reference to FIG. 1. Firstly, the array substrate onto which the alignment solution is printed is placed S31 in a freeze-drying apparatus; then, the array substrate is frozen S32 in the freeze-drying apparatus; after freezing, the freeze-drying apparatus is vacuumized S33; finally, the array substrate is heated S34 in the vacuum freeze-drying apparatus. By way of example, the array substrate may be quickly frozen to minus 40° C. to minus 50° C., and then the freeze-drying apparatus is vacuumized to remove excess solvent and possible moisture by means of sublimation. During such a freeze-drying process, the solvent can be removed by sublimation under high vacuum. Compared to the conventional solvent volatilization technique, the freeze-drying treatment according to this embodiment can decrease the surface activity of the quantum dot material so as to avoid as much as possible the deterioration phenomena such as agglomeration of the quantum dot material occurring during the process treatment.

According to a specific embodiment, heating S4 the array substrate after removing the solvent comprises microwave heating. Microwave heating can also be called microwave sintering, which is based on a principle of producing heating effect from the interaction between a material and an electromagnetic field. When the basic fine structure of a material is coupled to an electromagnetic field of a particular frequency, the internal microscopic particles will oscillate in response to the electromagnetic field, thereby increasing the thermal motion. Further, when dielectric loss occurs to the material, it will absorb microwave energy and convert it into thermal energy. Referring to FIG. 1, such a microwave heating process may specifically comprise: placing S41 the array substrate from which the solvent is removed in a microwave heating apparatus; and heating S42 the array substrate by a microwave process. Further, the microwave heating process may further comprise: maintaining S43 the array substrate at a constant temperature after heating the array substrate by a microwave process. It is generally required to subject the alignment material to heating processing considering the alignment function thereof. However, since the alignment film at that time further contains the quantum dot material, and the large surface energy of the quantum dot material makes it improper to undergo heating for a long time, the conventional heating methods will inevitably lead to the deterioration phenomena such as agglomeration of the quantum dot material. The microwave heating technique according to the embodiment of the present disclosure achieves faster rise in temperature, shorter heating and heat preservation time and more uniform heating than the conventional resistive heating method.

According to a specific embodiment, the alignment material in the alignment solution mentioned above may include a polyimide (PI) material. Of course, the present invention is not so limited. Further, the solvent used in the alignment solution may include an organic solvent. Specifically, such an organic solvent may include an aromatic solvent such as benzene. Likewise, those skilled in the art will be able to select suitable organic solvents depending on the specific practical needs and the corresponding alignment materials, which will not be limited in the present disclosure.

According to another aspect, an embodiment of the present disclosure further provides a quantum dot display device. Specifically, reference may be made to the quantum dot display devices shown in FIGS. 2 and 4. Such quantum dot display devices may be manufactured by means of the method for manufacturing a quantum dot display device as described in any one of the foregoing embodiments.

Embodiments of the present disclosure disclose a method for manufacturing a quantum dot display device and a corresponding quantum dot display device. In the method for manufacturing a quantum dot display device, the quantum dot material is first dissolved in the alignment solution. After the alignment film is formed on the array substrate by means of the printing process of the alignment solution, the quantum dot material is directly contained in the alignment film. In this way, direct contact of the quantum dot material with air and possible liquid crystal materials is effectively prevented, thereby protecting it from contamination and ensuring its effectiveness. In addition, since the alignment film containing the quantum dot material is directly formed on the surface of the array substrate, accordingly, the quantum dot material is completely inside the display panel. As a result, the special packaging requirement for the quantum dot material is avoided, and the relative independence of the quantum dot material and the photoluminescence effect are ensured. In summary, with the above manufacturing process, the display effect of the resulting quantum dot display device is greatly improved, the associated manufacturing cost is reduced, and the manufacturing process and the packaging process are simplified.

It is to be noted that, in the specific description of the present disclosure, terms that denote the orientations or positional relationships such as "center", "upper", "lower", "front", "rear", "left", "right", "vertical", "horizontal", "top", "bottom", "inside", "outside", and the like are based on the orientations or positional relationships shown in the drawings, only for the purpose of simplifying the description of the present disclosure, rather than implying that the concerned device or element must have a particular orientation, or must be constructed and operated in a particular orientation. Thus, all of the terms and terms having equivalent meanings shall not be construed as limiting the present invention.

It is to be further noted that, in the specific description of the present disclosure, terms such as "first", "second" and the like are for descriptive purposes only and are not to be construed as implying a relative importance, or implying the number of technical features indicated. Therefore, features defined with terms such as "first" and "second", etc. may explicitly or implicitly include one or more such features. Unless otherwise specified, "multiple" means two or more in the description of the present disclosure.

It is to be further noted that, in the description of the present disclosure, terms such as "mount", "link", "connect" and the like should be understood in a broad sense unless otherwise expressly specified and defined. For example, it can be a fixed connection, a detachable connection, or even a one-piece connection. Likewise, it can be a direct connection, an indirect connection by an intermediate medium, or even an internal communication between two elements. The specific meanings of the above-mentioned terms in the present disclosure can be understood by those ordinarily skilled in the art based on specific situations.

It is to be further noted that, in the description of this specification, specific features, structures, materials, or characteristics may be combined in any suitable manner in any one or more embodiments or examples.

The above embodiments are only some embodiments of the present invention, but the protection scope of the invention is not so limited. Variations or replacements that can be easily conceived by any skilled person familiar with this technical field within the technical scope revealed by the present disclosure shall be encompassed within the protection scope of the present invention. Thus, the protection scope of the present invention shall be based on the scope of the claims.

The invention claimed is:

1. A method for manufacturing a quantum dot display device, comprising:
    providing an array substrate and a counter substrate opposite to each other;
    printing an alignment solution containing a quantum dot material onto a side of the array substrate facing the counter substrate;
    removing a solvent in the alignment solution printed onto the side of the array substrate facing the counter substrate;
    after removing the solvent, heating the array substrate; and
    providing a backlight source at a side of the array substrate facing away from the counter substrate wherein the printing comprises relief printing, wherein the relief printing comprises: dropping the alignment solution onto an anilox roller by a dispenser; by means of rotation of the anilox roller and a printing roller on which a relief printing plate is mounted, transferring the alignment solution dropped onto the anilox roller to the relief printing plate, wherein a rotation direction of the printing roller is opposite to that of the anilox roller and a ratio of linear velocities thereof is within a certain range, and wherein the relief printing plate is at least partially in contact with and pressed against the anilox roller during rotation with the printing roller; and by means of rotation of the relief printing plate and translation of the array substrate, transferring the alignment solution transferred to the relief printing plate onto the array substrate, wherein during the transferring process, the relief printing plate is externally tangent to the array substrate and has a same linear velocity with the array substrate.

2. The method according to claim 1, wherein a ratio of rotational linear velocities of the printing roller and the anilox roller is 1.05 to 0.09.

3. The method according to claim 1, further comprising:
    providing a liquid crystal cell between the array substrate and the counter substrate, wherein printed patterns of the relief printing plate correspond to patterns of the liquid crystal cell.

4. The method according to claim 3, wherein there further exists a gap region between printed patterns of the relief printing plate.

5. The method according to claim 1, wherein the relief printing further comprises:
    prior to transferring the alignment solution dropped onto the anilox roller to the relief printing plate, planarizing the alignment solution dropped onto the anilox roller using a scraper.

6. The method according to claim 1, wherein the removing comprises removal by freeze-drying treatment.

7. The method according to claim 6, wherein the freeze-drying treatment comprises:
    placing the array substrate onto which the alignment solution is printed in a freeze-drying apparatus;
    freezing the array substrate in the freeze-drying apparatus;
    vacuumizing the freeze-drying apparatus after freezing; and
    heating the array substrate in the vacuumized freeze-drying apparatus.

8. The method according to claim 1, wherein the heating comprises microwave heating.

9. The method according to claim 8, wherein the microwave heating comprises:

placing the array substrate from which the solvent is removed in a microwave heating apparatus; and heating the array substrate by a microwave process.

10. The method according to claim 9, wherein the microwave heating further comprises:

maintaining the array substrate at a constant temperature after heating the array substrate by a microwave process.

11. The method according to claim 1, wherein an alignment material in the alignment solution includes a polyimide material.

12. The method according to claim 1, wherein the solvent includes an organic solvent.

13. A quantum dot display device manufactured by means of the method according to claim 1.

* * * * *